Figure 1:
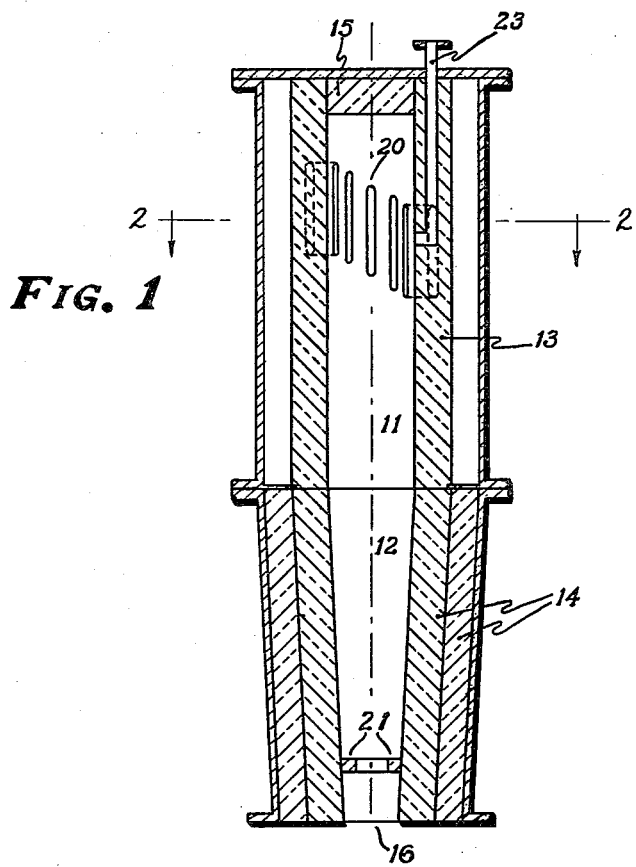

Oct. 15, 1963  W. FLASSKAMP ETAL  3,106,955
PROCESS AND AN APPARATUS FOR BURNING A RESIDUAL
GAS OF LOW HEATING VALUE
Filed Dec. 1, 1959

INVENTORS
Willi Flasskamp
Gerd Wellensiek
BY

3,106,955
PROCESS AND AN APPARATUS FOR BURNING A RESIDUAL GAS OF LOW HEATING VALUE

Willi Flasskamp, Stierstadt, Taunus, and Gerd Wellensiek, Hoesel, Bezirk Dusseldorf, Germany; said Flasskamp assignor to Deutsche Gold- und Silber-Scheideanstalt vormals Roessler, Frankfurt am Main, Germany, a corporation of Germany; said Wellensiek assignor to Rekuperator K.-G. Dr.-Ing. Schack & Co., Dusseldorf (Rhine), Germany, a corporation of Germany
Filed Dec. 1, 1959, Ser. No. 856,453
Claims priority, application Germany Dec. 2, 1958
7 Claims. (Cl. 158—7)

In carrying out some processes, a by-product gas is obtained which is so low in heating value and so difficult to burn on a sustained basis without pretreatment or purification of some kind that its utility as a fuel gas is virtually nil. Such as gas may contain, for example, solid combustible substances in suspension and/or water vapor or steam. Thus for instance, in certain types of carbon black preparation, a residual gas with low heating value is obtained, in which despite the use of cyclones, filter arrangements and the like, small amounts of soot are still present. Besides soot also water vapor may be present in the hot residual gas, the relative amount of water vapor or steam being especially high when the hot gas-soot mixture has been quenched directly with a water spray. The soot content of such a residual gas can easily amount to between 0.05 and 1 g./m.$^3$ while the content of water vapor can be as much as 50% by volume. The heating value of such a gas normally amounts to about 400 to 650 Kcal./m.$^3$ of the moist gas at standard conditions of temperature and pressure.

In order to make such a gas really useful for heating purposes, one has heretofore had to proceed by cooling the gas to below the dew point. Thereby indeed it is possible to remove the condensed water but, at the same time, the soot separates out in the coolers and it frequently causes considerable disturbances in these. Also the circulatory water resulting from the auxiliary washing process is contaminated with the soot particles. Moreover, any soot recovered therefrom is of low quality and constitutes largely an undesirable waste product.

Now a process and arrangement (equipment) for the combustion of residual gases of low heating value containing, as the case may be, combustible solid substances, in particular soot, and/or water vapor, has been found, in which the mentioned disadvantages are not present. The new process, which was tested in several series of experiments, is characterized by the fact that the gas to be burned is introduced tangentially with high kinetic energy into the combustion chamber having a temperature that is above the lower ignition limit, and here the combustion air is introduced stepwise via a series of radial slits arranged in a spiral pattern around the outer periphery of said combustion chamber in such a way that the combustion of the gas takes place initially and occurs preferentially in a zone at the outer periphery of said chamber prior to the attainment of complete mixing of gas and air and the establishment of an overall stoichiometric combustion mixture.

The equipment for carrying out this process is relatively simple and consists essentially of a cylindrical combustion chamber enclosed by refractory walls and provided with a tangential entrance for the low B.t.u. gas near one end, radial slits in the sidewalls immediately downstream for the admission of combustion air, and an exit opening at the other end for discharge of the combusted mixture. The portion of the wall of the main combustion chamber in which the radial slits are located should be surrounded by a gastight case, to which air can then be supplied under suitable pressure to cause it to pass through said slits. If desired, the main combustion chamber can be supplemented by attaching to its exit end an afterburning chamber of about the same length but preferably tapering down to a small diameter at its downstream end.

If a premixed air-gas mixture were led with high speed through a tangential entry of a combustion chamber, there would be considerable danger of separation of the reactable components of the mixture, thus making an already difficult combustion reaction even less likely to proceed. The combustion arrangement, according to the present invention, is therefore of critical design. In this design the feeding of air gradually from a separate chamber through the radial slits plays a particularly important role. In this way, the air is slowly diffused through the layer of residual gas, which is passed in tangentially at a high rate of speed at the periphery of the main combustion chamber. A separation into unreacting components is not possible hereby. Instead, the air contacts selectively the most reactive part of the residual gas under the most reactive conditions which exist initially at the surface of the refractory wall. From U.S. Patent 1,618,808 an arrangement is known, in which solid pulverized fuel is to be burned; in contrast to this known arrangement with slits entering tangentially, placed side by side, and distributed over the entire length of combustion for the admission of combustion air, the slits in the present invention are radial and are arranged in a spiral pattern in the portion of the combustion chamber which is immediately adjacent the tangential inlet for residual gas in such a way that the air enters perpendicularly to the axis of the combustion chamber.

The gas to be burned, as already mentioned, is thereby led in with high kinetic energy tangentially to the main combustion chamber, the temperature of which is above the lower ignition limit of the gas. A blower presses the combustion air into the case or shell surrounding the slotted portion of the chamber and from here it flows into the main combustion zone through the slits. In the special method described for bringing together the gas and the air, there arises such a high combustion temperature, e.g., 1,200 to 1,300° C., that this is sufficient, together with the contact effect on the refractory chamber lining produced by the tangential flow, to burn up the solid materials contained in the gas completely in the shortest flame. This is attained in particular by the above described arrangement of air slits, as hereby on the lining no adhering and cooling mantle of air can form so that, in this way, the solid materials to be burned are brought directly into contact with the glowing wall. Also only in this arrangement will the necessary high wall temperature be maintained for the satisfactory combustion of whatever combustible solid substance and water vapor may be present in the residual gas since the high wall temperatures also have an accelerating effect on $H_2O$ splitting.

The length of the individual air slits should not exceed ⅓ of the length of the main combustion chamber, being preferably ¼ to ⅕ thereof. It is best to select a slit width of about 5 to 8% of the slit length.

In order to aid the residual combustion in the afterburning chamber this is built to be slightly conical and at times is further constricted, at the outlet opening. Thus, it is particularly effective to arrange in the vicinity of the outlet a restrictor ring made of highly first-resistant material since this will serve as a heat dam (for banking up the temperature), the opening being for example ⅓ to ¼ that of the cross sectional area of the neighboring after-burning chamber.

For heating up the combustion chamber initially or intermittently, a connection for high grade fuel, e.g. long distance (natural) gas, can be built into the residual gas inlet line. It is desirable also to build in a pilot flame, which reignites the residual gas in the case of spontaneous interruption of combustion.

Figure 2:
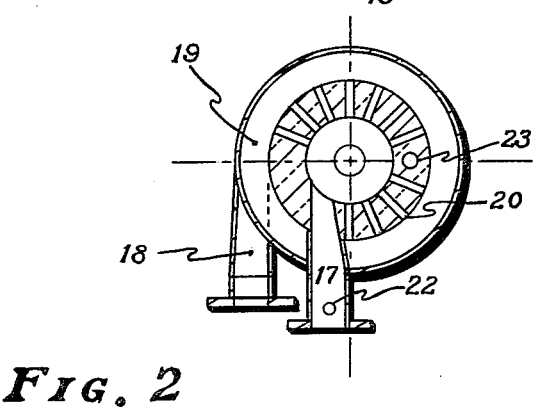

A clearer understanding of the present invention will be obtained by means of the attached drawings; however, it should be understood that the invention is by no means limited to the preferred embodiment or method of operation described here. In the drawings, FIG. 1 represents a longitudinal section through a typical combustion apparatus while FIG. 2 is a section along the dotted line 2—2 of FIG. 1. The main combustion zone is designated by 11, the directly connected after-burning chamber is designated by 12 and the lateral walls enclosing these chambers and which are made of highly fire-resistant material are designated by 13 and 14. The overall combustion apparatus is thus closed in the upstream direction by refractory end wall 15 and, in the downstream direction, terminates in the outlet 16.

Through pipe 17 the soot-containing residual gas, which is usually available at a temperature of 200 to 300° C. is introduced tangentially into chamber 11. A blower (not shown in the drawing) presses the combustion air through pipe 18 into annular casing 19.

In the part of the main chamber wall 13, immediately adjacent the tangential gas inlet 17, radial slits are arranged in a spiral pattern, set more or less counter to each other around most of the circumference of the chamber. Through these slits 20 the combustion air enters chamber 11 radially to the main axis thereof. In the particular configuration depicted here, the length of the individual slits comes to about ¼ the length of chamber 11; they are distributed along three-quarters of the circumference.

The after-burning chamber 12, here shown as having about the same length as the main combustion chamber 11, tapers down to a smaller diameter toward outlet 16. In the neighborhood of outlet 16 there is refractory ring 21 which constricts the cross section of the chamber. The cross sectional area of the opening in this ring is about ⅓ that of the generally conical shaped afterburning chamber 12 at this particular point.

The initial heating up of the main combustion chamber 11 can be acomplished with the aid of any easily combustible fuel, e.g. even a residual gas can be used. As has already been mentioned it is, however, recommended in many cases for putting the combustion arrangement into operation, to heat up the main combustion chamber 11 with gas of high heating value, e.g. natural gas. Other gases of high B.t.u. content can equally well be used, especially hydrogen, methane and other well known gaseous fuels such as those consisting largely of low molecular weight, normally gaseous hydrocarbons. For this purpose additional gas line 22, connecting into the gas inlet line 17, is provided. Further, it is advantageous to provide a pilot flame 23 in main combustion chamber for the purpose of continuing the residual gas combustion in case of interruption.

The inventive idea includes not only the combustion of gases with low heating value, in which fine solid materials are contained, and the combustion of soot containing, moist or dry residual gases, but also other moist or dry waste gases of low heating value which contain other solid materials.

It is possible to use the novel process and apparatus of the present invention also for the combustion of low grade soot that no longer has commercial value. In the descriptive introduction a residual gas with a soot content, for example, or 0.05 to 1 g./m.³ was mentioned. In the combustion of waste soot it is possible greatly to increase the soot content of the residual gas without disturbances arising relative to the combustion process, as has been shown by special experiments. Hereby an opportunity is created to obtain some value from waste soot, that is no longer useful or suitable as a commercial product.

The heat content of hot combustion gases that leave the afterburning chamber can be utilized in any way desired. Thus, for example, the new combustion arrangement may be built onto a steam boiler or a drying plant in order to utilize the heat here. As the solids contained will be burned without residue already, no deposits will occur.

*Example*

The gas to be burned up is taken from an apparatus producing carbon black according to the furnace process.

Gas to be burned up:
    Quantity _____ Nm.³/h 650–750
    Temperature _____ ° C. 145–155
    Water vapor content _____ vol.-percent 37–40
    Carbon black content _____ g./Nm.³ 0.7–1.3
    Heating value _____ Kcal./Nb.³ 420–570
    Composition (dry gas):
        $CO_2$ _____ volume-percent__ 4.8–5.4
        $O_2$ _____ do____ 1.0–1.5
        $CO$ _____ do____ 13.0–14.3
        $H_2$ _____ do____ 7.2–9.7
        $CH_4$ _____ do____ 0.6–1.6
        $C_2H_4$ _____ do____ 0.5–1.0
        $N_2$ _____ do____ 72.9–76.5
Combustion air _____ Nm.³/h__ 330–350
High grade fuel gas for ignition flame
   (appr. 4000 Kcal./Nm.³) _____ appr. m.³/h__ 5–10

A final temperature of approximately 1,060° C. was measured in the equipment. No carbon black was perceptible in the gas burned up.

Using preheated combustion air and preheated gas, it is possible to increase the final temperature.

Having described our invention together with preferred embodiments thereof, what we claim and desire to secure by U.S. Letters Patent is:

1. Apparatus for burning a residual gas of low heating value comprising a cylindrical combustion chamber having a tangential gas inlet at the outer periphery of the upstream end, a single series of radial slits of substantially uniform size cut through the lateral wall of said chamber beginning immediately downstream of said gas inlet, said slits running substantially parallel to one another and to the axis of said chamber and being located at regular intervals around the circumference of said chamber but with the mid-point of each slit in said series being slightly downstream of that of the one immediately previous thereto so that said series of slits forms a substantially regular helical pattern in the lateral wall of said chamber, a cylindrical casing surrounding and spaced apart from that portion of said chamber wall in which said slits are located so as to form an annular space between said chamber wall and said casing, means to supply a residual gas to said tangential gas inlet at high velocity, means to supply a molecular oxygen containing gas to said annular space under a pressure greater than that existing in said combustion chamber and means to withdraw reaction products from the downstream end of said combustion chamber.

2. Apparatus as described in claim 1 in which there is attached to the downstream end of said combustion chamber an additional after-burning chamber of about the same length as said combustion chamber.

3. Apparatus as described in claim 2 in which the afterburning chamber tapers down in inside diameter gradually from the end attached to the combustion chamber to the opposite end where reaction products discharge.

4. Apparatus as described in claim 2 in which a restrictor ring is located inside the afterburning chamber near the discharge end, said restrictor ring having a single central opening therein, the cross sectional area of which is about ⅓ to ¼ that of the afterburning chamber at the same point.

5. A process for burning a difficult combustible residual gas of low heating value comprising introducing said residual gas tangentially with high kinetic energy, at one end of a combustion chamber having an elongated cylindrical reaction zone so as to form a high velocity spinning layer moving in a spiral path along the outer periphery of said elongated cylindrical reaction zone, introducing molecular oxygen containing gases into said spinning residual gas exclusively in a single series of radially directed streams beginning immediately downstream from the location at which said residual gas is introduced and continuing along at regular intervals in a helical shaped spiral series around the outer periphery of said reaction zone so that a combustible mixture of said residual gas with molecular oxygen is formed selectively in a localized region at the outer periphery of said reaction zone, and igniting and burning said combustible mixture as it flows along through said localized region at the outer periphery of said reaction zone.

6. The process of claim 5 further characterized by burning an auxiliary gas of high B.t.u. content in sufficient amounts to preheat and maintain the outer periphery of said reaction zone at a temperature above the lower ignition limit of the said residual gas.

7. A process as described in claim 6 in which the gas of high B.t.u. content is selected from the group consisting of hydrogen, natural gas, and methane.

References Cited in the file of this patent

UNITED STATES PATENTS

| | | |
|---|---|---|
| 1,617,694 | Schwartz | Feb. 15, 1927 |
| 2,018,582 | Theunissen | Oct. 22, 1935 |
| 2,253,160 | Arnold | Aug. 19, 1941 |
| 2,368,827 | Hanson et al. | Feb. 6, 1945 |
| 2,617,255 | Niehus | Nov. 11, 1952 |
| 2,753,925 | Campbell et al. | July 10, 1956 |

FOREIGN PATENTS

| | | |
|---|---|---|
| 471,330 | Germany | Feb. 11, 1929 |
| 476,721 | Germany | May 28, 1929 |